(12) United States Patent
Luo et al.

(10) Patent No.: US 11,721,963 B2
(45) Date of Patent: Aug. 8, 2023

(54) BUS BAR ASSEMBLY

(71) Applicant: Tyco Electronics (Shanghai) Co. Ltd., Shanghai (CN)

(72) Inventors: Jie (Roger) Luo, Shanghai (CN); Guangming (Suny) Zhao, Shanghai (CN); Jiaoyong (Mac) Liu, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 87 days.

(21) Appl. No.: 17/371,705

(22) Filed: Jul. 9, 2021

(65) Prior Publication Data

US 2022/0014005 A1 Jan. 13, 2022

(30) Foreign Application Priority Data

Jul. 9, 2020 (CN) .......................... 202010656919.1

(51) Int. Cl.
*H02G 5/02* (2006.01)

(52) U.S. Cl.
CPC .................................. *H02G 5/025* (2013.01)

(58) Field of Classification Search
CPC .......... B60M 1/30; B60M 1/307; B60M 1/20; B60M 1/24; B60M 1/234; B60M 7/00; B60M 7/003; H02B 1/20; H02B 1/22; H02B 1/044; H02G 5/00; H01H 85/0417; H01H 85/147; H01H 1/5822; H01H 15/06

See application file for complete search history.

(56) References Cited

U.S. PATENT DOCUMENTS

| 4,002,388 A * | 1/1977 | Menocal .................. H02B 1/21 439/884 |
| 5,088,940 A * | 2/1992 | Saito ...................... H01R 13/68 439/620.34 |
| 5,160,274 A * | 11/1992 | Ozaki .................. H01R 9/2458 439/724 |
| 5,256,502 A * | 10/1993 | Kump ................. H01M 50/342 429/150 |
| 5,322,445 A * | 6/1994 | Ozaki .................. H01R 9/2458 439/724 |
| 5,562,502 A * | 10/1996 | Kourimsky ............ H01H 85/20 439/949 |
| 6,402,569 B1 * | 6/2002 | Spadoni ................. H05K 1/144 439/949 |
| 6,661,672 B2 * | 12/2003 | Ito ........................... H05K 7/026 361/752 |
| 6,824,430 B2 * | 11/2004 | Matsumura .......... H01H 85/044 439/620.29 |

(Continued)

FOREIGN PATENT DOCUMENTS

DE           4205262 C1 *  5/1993  .............. H02B 1/20

*Primary Examiner* — Krystal Robinson
(74) *Attorney, Agent, or Firm* — Barley Snyder

(57) ABSTRACT

A bus bar assembly comprises a first bus bar having a first body part, a plurality of first installation parts and a first output part, and a second bus bar having a second body part, a plurality of second installation parts and a second output part. A first connection terminal is fixedly connected to the first output part, and a second connection terminal is fixedly connected to the second output part. The first body part is arranged over and parallel to the second body part, and the first output part and the second output part are arranged adjacent one another.

20 Claims, 3 Drawing Sheets

(56) References Cited

U.S. PATENT DOCUMENTS

| | | | | |
|---|---|---|---|---|
| 7,580,247 B1 | * | 8/2009 | Pearson | H02B 1/056 |
| | | | | 174/68.2 |
| 8,130,070 B2 | * | 3/2012 | Shibata | H01H 85/044 |
| | | | | 337/229 |
| D784,265 S | * | 4/2017 | Perlaguri | D13/154 |
| 9,685,715 B2 | * | 6/2017 | Yamauchi | H01M 8/04574 |
| D867,300 S | * | 11/2019 | Huang | D13/154 |
| 2018/0048127 A1 | * | 2/2018 | Liang | H02B 1/20 |

* cited by examiner

BUS BAR ASSEMBLY

CROSS-REFERENCE TO RELATED APPLICATIONS

This application claims priority under 35 U.S.C. § 119 to Chinese Patent Application No. 202010656919.1 filed on Jul. 9, 2020, and Chinese Patent Application No. 202021336799.9, also filed on Jul. 9, 2020, the entire disclosures of which are incorporated herein by reference.

FIELD OF THE INVENTION

The present disclosure relates to a bus bar assembly, and more particularly, to a bus bar assembly adapted to electrically connect electrical equipment to a power supply unit.

BACKGROUND

Electrical devices, such computers, are commonly connected to a respective power supply via a bus bar. More specifically, a first bus bar associated with the power supply is connected to a second bus bar associated with the electronic device. In prior art arrangements, however, the positions of the first and second bus bars are not adjustable. Therefore, as a result of assembly and/or manufacturing errors relating to either bus bar, connecting elements, such as corresponding connecting holes of the first and second bus bars, will not properly align, making connections therebetween difficult or unobtainable.

In addition, prior art bus bars require multiple plating steps, including plating tin on an output portion of the bus bar, and plating nickel on remaining portions thereof. These electroplating steps needed to shield a non-tinned area of the bus bar are very time-consuming and expensive. Moreover, prior art bus bars include output portions having a width that cannot be greater than a width of a corresponding body portion of the bus bar due to inherent structural limitations resulting from the shape of the bus bar. This limits the overall current-carrying capacity of the bus bar, and thus its usability.

Accordingly, improved bus bars are desired which offer adjustable alignment for mating with other bus bars or electrical components, reduced electroplating needs, and improved current capacity resulting from more advantageous structural configurations.

SUMMARY

According to an embodiment of the present disclosure, a bus bar assembly comprises a first bus bar including a first body part, a plurality of first installation parts and a first output part, and a second bus bar including a second body part, a plurality of second installation parts and a second output part. A first connection terminal is fixedly connected to the first output part, and a second connection terminal is fixedly connected to the second output part. The first body part is arranged over and parallel to the second body part, and the first output part and the second output part are arranged adjacent one another.

BRIEF DESCRIPTION OF THE DRAWINGS

The invention will now be described by way of example with reference to the accompanying Figures, of which.

DETAILED DESCRIPTION OF THE EMBODIMENTS

Figure 1:
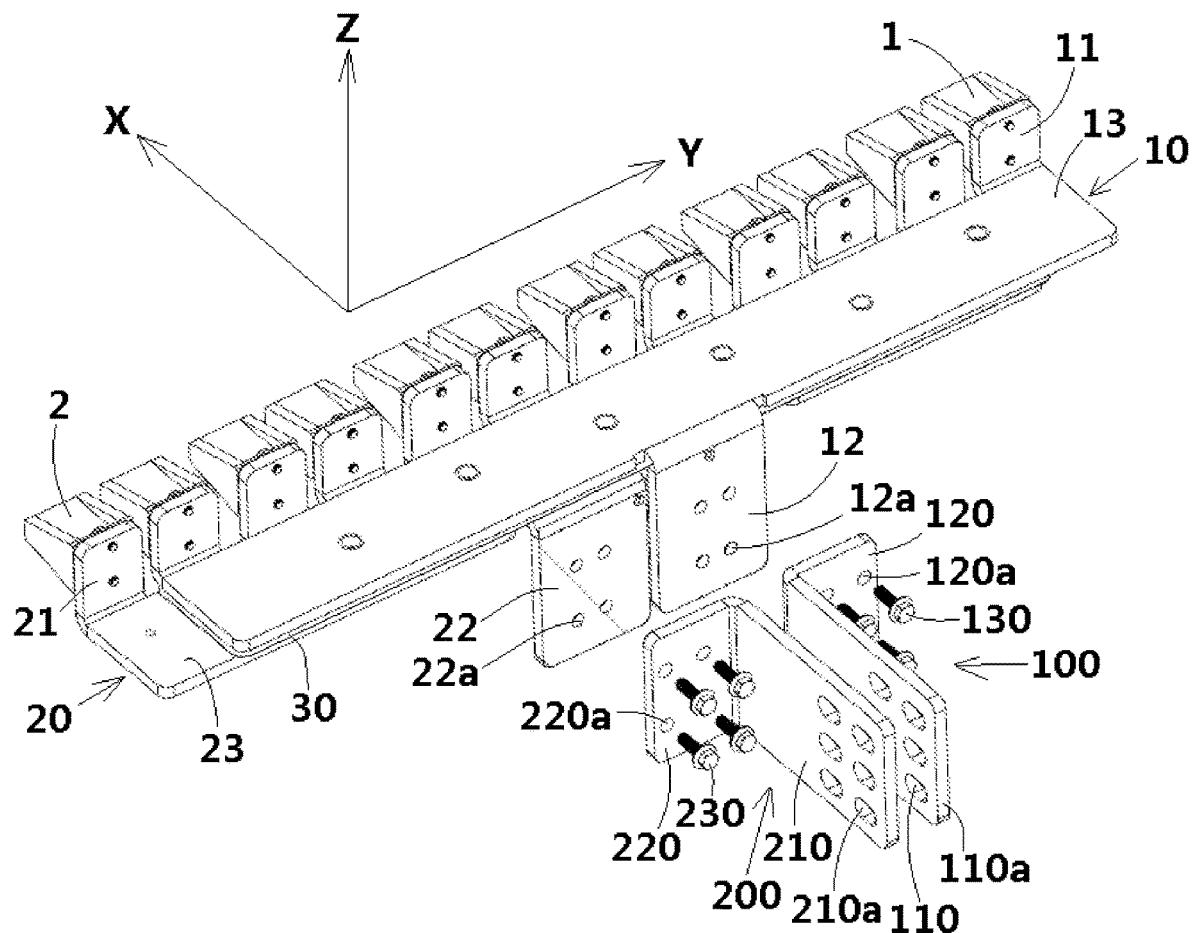
FIG. 1 shows a schematic perspective diagram of a bus bar assembly according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to embodiments of the present disclosure, a bus bar assembly comprises a first bus bar having a first body part, a plurality of first installation parts and a first output part, and a second bus bar having a second body part, a plurality of second installation parts and a second output part. A first connection terminal is fixedly connected to the first output part, and a second connection terminal is fixedly connected to the second output part. The first body part and the second body part are arranged adjacent and parallel to each other, and the first output part and the second output part are arranged side by side.

FIG. 1 shows a schematic perspective diagram of a bus bar assembly according to an exemplary embodiment of the present disclosure. In the illustrated embodiment, the bus bar assembly comprises a first bus bar 10, a second bus bar 20, a first connection terminal 100 and a second connection terminal 200. The first bus bar 10 comprises a first body part 13, a plurality of first installation parts 11 and a first output part 12. The second bus bar 20 comprises a second body part 23, a plurality of second installation parts 21 and a second output part 22. The first connection terminal 100 is fixedly connected to the first output part 12. The second connection terminal 200 is fixedly connected to the second output part 22. The first body part 13 and the second body part 23 are arranged adjacent and parallel to each other, and the first output part 12 and the second output part 22 are arranged side by side. As shown, the first output part 12 and the second output part 22 are located in the middle position of the first body part 13 and the second body part 23 in the length direction Y, respectively. In the illustrated embodiment, the bus bar assembly further comprises an insulation component 30 arranged between the first body part 13 and the second body part 23 to electrically isolate the first body part 13 from the second body part 23. The insulation component 30 may be a sheet-shaped insulation isolation pad, by way of example.

Still referring to FIG. 1, a position of the first connection terminal 100 relative to the first bus bar 10 is adjustable, and a position of the second connection terminal 200 relative to the second bus bar 20 is also adjustable. Therefore, even if there is an error in the assembling and processing of the bus bars, the influence of the error of the bus bars may be eliminated by adjusting the position of the connecting terminal, so that the connection of the bus bars can be conveniently realized.

The first body part 13 and the second body part 23 are in the shape of an elongated plate, and the first output part 12 and the second output part 22 are connected to one longitudinal side of the first body part 13 and one longitudinal side of the second body part 23, respectively. Thus, the widths of the first output part 12 and the second output part 22 may not be affected by the widths of the first body part 13 and the second body part 23. In this way, the widths of the first output part 12 and the second output part 22 may be equal to or greater than the widths of the first main body part 13 and the second main body part 23, so that the current carrying capacity may be improved.

The first output part 12 and the second output part 22 are plate-shaped and located in the same plane perpendicular to a width direction X of the first body part 13 and the second body part 23. The first body part 13 and the second body part 23 have the same width, and two longitudinal sides of the first body part 13 are flush with two longitudinal sides of the second body part 23, respectively. Further, the widths of the first output part 12 and the second output part 22 (i.e., in the Y direction) are equal and not less than the width of the first body part 13 and the width of the second body part 23, such that a width of a connection portion between the first output part 12 and the first body part 13 is not less than that of a connection portion between the second output part 22 and the second body part 23. The width of the connection portion between the first output part 12 and the first body part 13 and the width of the connection portion between the second output part 22 and the second body part 23 are not less than 57.0 mm.

The first connection terminal 100 comprises a plate-shaped first connection portion 120 abutting on the first output part 12 and fixed to the first output part 12; and the second connection terminal 200 comprises a plate-shaped second connection portion 220 abutting on the second output part 22 and fixed to the second output part 22. The first connection terminal 100 further comprises a first external connection plate 110, the first external connection plate 110 being connected to a side of the first connection portion 120 and perpendicular to the first external connection plate 110, so that the first connection terminal 100 is L-shaped; and the second connection terminal 200 further comprises a second external connection plate 210, the second external connection plate 210 being connected to a side of the second connection portion 220 and perpendicular to the second external connection plate 210, so that the second connection terminal 200 is L-shaped.

In the illustrated embodiment, the second external connection plate 210 is connected to a side of the second connection portion 220 adjacent to the first external connection plate 110, so that the surface of the first external connection plate 110 and the surface of the second external connection plate 210 are adjacent and parallel to each other, and the surface of the first external connection plate 110 and a surface of the second external connection plate 210 are perpendicular to a length direction Y of the first body part 13 and the second body part 23.

The plurality of first installation parts 11 are connected to the other longitudinal side of the first body part 13 and arranged in a row, and the plurality of second installation parts 21 are connected to the other longitudinal side of the second body part 23 and arranged in a row. The first body part 13 and the second body part 23 have the same length and are staggered by a predetermined distance in the length direction Y, so that the first installation parts 11 and the second installation parts 11 are arranged alternately in the length direction Y. The first installation parts 11 and the second installation parts 21 are plate-shaped and perpendicular to the width direction X of the first body part 13 and the second body part 23, and the first installation parts 11 and the second installation parts 21 are arranged in the same plane and arranged in a row along the length direction Y of the first body part 13 and the second body part 23. The first installation parts 11 and the first output part 12 are located on two opposite sides of a thickness direction Z of the first body part 13, respectively, and the second installation parts 21 and the second output part 22 are located on two opposite sides of the thickness direction Z of the second body part 23, respectively. The bus bar assembly further comprises a plurality of first connectors 1 fixedly connected to the plurality of first installation parts 11, respectively; and a plurality of second connectors 2 fixedly connected to the plurality of second installation parts 21, respectively.

In the illustrated embodiment, as shown in FIG. 1, the bus bar assembly further comprises a first bolt 130 and a first nut arranged on a back side of the first output part 12, the first bolt 130 passing through first connection holes 120a, 12a in the first connection portion 120 and the first output part 12 and being threaded connected with the first nut. A diameter of the first connection hole 120a in the first connection portion 120 is larger than a diameter of the first bolt 130. In this way, a position of the first connection terminal 100 relative to the first bolt 130 is adjustable to make the position of the first connection terminal 100 relative to the first bus bar 10 adjustable. In other embodiments, the connection holes 12a may be threaded and the first nut may be omitted.

In the illustrated embodiment, the bus bar assembly further comprises a second bolt 230 and a second nut arranged on a back side of the second output part 22, the second bolt 230 passing through connection holes 220a, 22a in the second connection portion 220 and the second output part 22 and being threaded connected with the second nut. A diameter of the second connection hole 220a in the second connection portion 220 is greater than a diameter of the second bolt 230 such that a position of the second connection terminal 200 relative to the second bolt 230 is adjustable to make the position of the second connection terminal 200 relative to the second bus bar 20 adjustable. In other embodiments, the connection holes 22a may be threaded and the second nut may be omitted.

In the illustrated embodiment, as shown in FIG. 1, the first bus bar 10 is adapted to be connected to a first pair of matching bus bars not shown by the first connection terminal 100, and the first external connection plate 110 is formed with a plurality of third connection holes 110a, the position of the first connection terminal 100 relative to the first bus bar 10 is adjustable so that the plurality of third connection holes 110a and the plurality of connection holes in the first pair of matching bus bars are aligned, respectively. The second bus bar 20 is adapted to be connected to a second pair of matching bus bars not shown by the second connection terminal 200, and the second external connection plate 210 is formed with a plurality of forth connection holes 210a, the position of the second connection terminal 200 relative to the second bus bar 20 is adjustable so that the plurality of forth connection holes 210a and the plurality of connection holes in the second pair of matching bus bars are aligned, respectively.

In the illustrated embodiment, the entire surface of the first bus bar 10 is formed with a tin coating, and only a surface area of the first connection terminal 100 that is in contact with the first bus bar 10 is formed with a tin coating; and the entire surface of the second bus bar 20 is formed with a tin coating, and only a surface area of the second connection terminal 200 that is in contact with the second bus bar 20 is formed with a tin coating. The surface area of the first connection terminal 100 other than the surface area that is in contact with the first bus bar 10 is formed with a nickel-plated layer. The surface area of the second connection terminal 200 other than the surface area that is in contact with the second bus bar 20 is formed with a nickel-plated layer.

Figure 2:
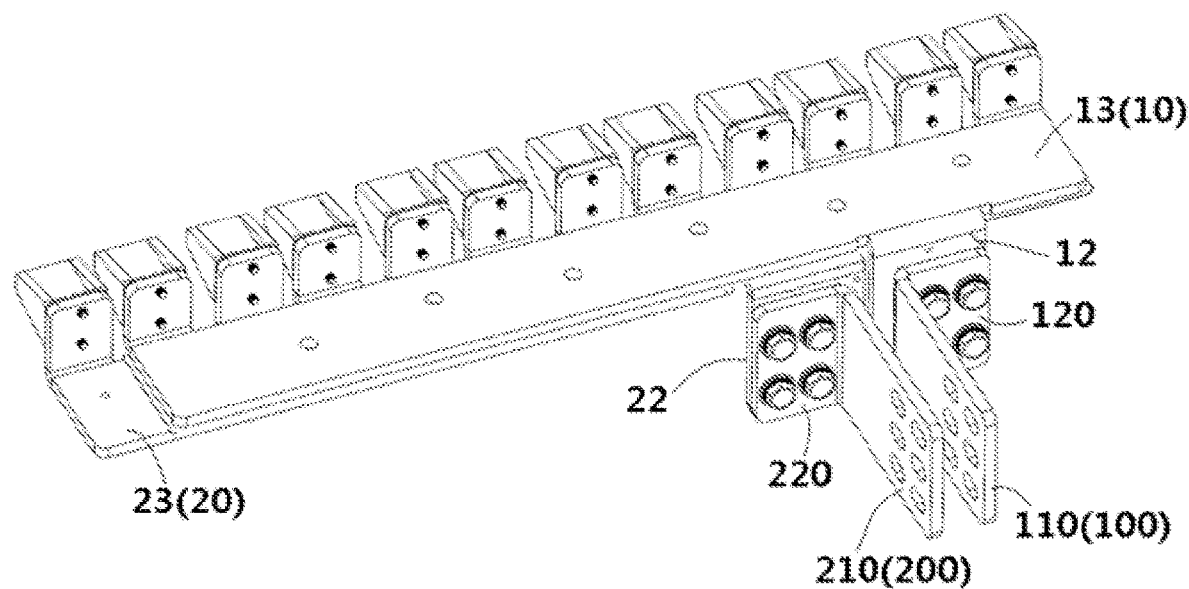
FIG. 2 shows a schematic perspective diagram of a bus bar assembly according to another exemplary embodiment of the present disclosure.
Figure 3:
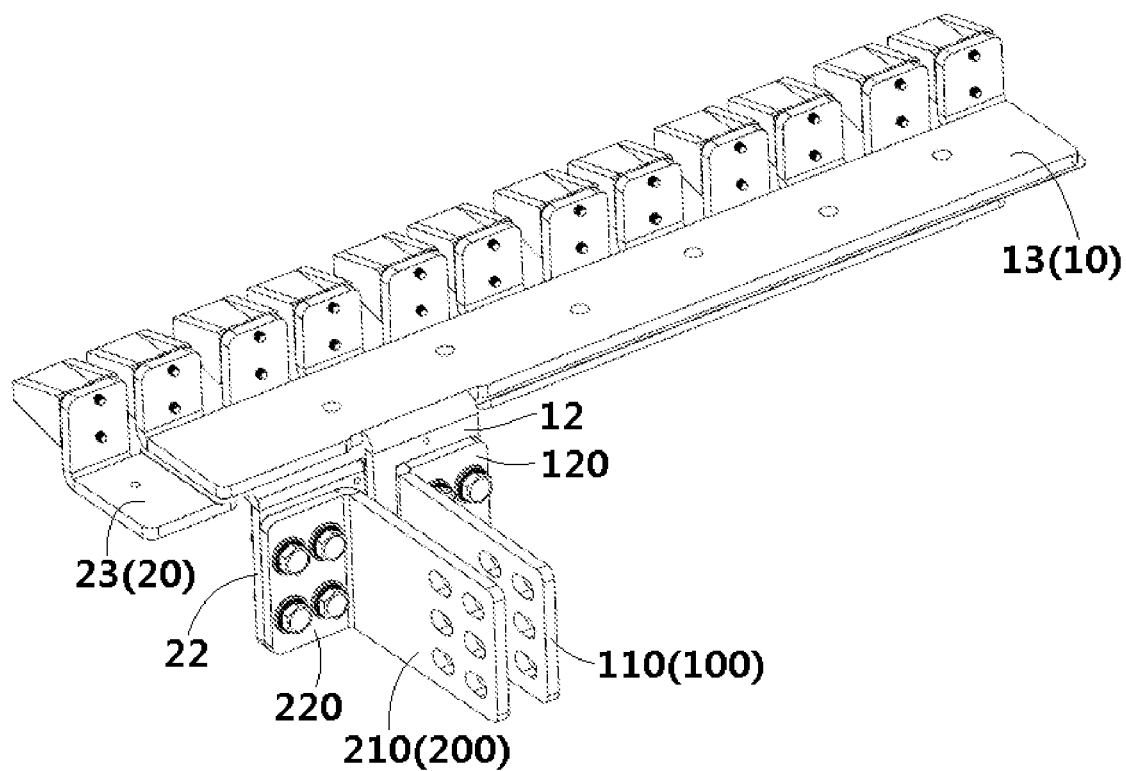
FIG. 3 shows a schematic perspective diagram of a bus bar assembly according to yet another exemplary embodiment of the present disclosure.

FIG. 2 shows a schematic perspective diagram of a bus bar assembly according to another exemplary embodiment of the present disclosure, and FIG. 3 shows a schematic perspective diagram of a bus bar assembly according to yet another exemplary embodiment of the present disclosure. The bus bar assembly shown in FIGS. 2 and 3 differs from the bus bar assembly shown in FIG. 1 only in the positions of the first output part 12 and the second output part 22. As shown in FIG. 2, the first output part 12 and the second output part 22 are located at one end of the first body portion 13 and the second body portion 23 in the length direction Y, respectively. As shown in FIG. 3, the first output part 12 and the second output part 22 are located at the other end of the first body part 13 and the second body part 23 in the length direction Y, respectively.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A bus bar assembly, comprising:
a first bus bar including a first body part in the shape of an elongated plate, a plurality of first installation parts and a plate-shaped first output part, the first output part connected to one longitudinal side of the first body part and extending perpendicularly to the first body part;
a second bus bar including a second body part in the shape of an elongated plate, a plurality of second installation parts and a plate-shaped second output part, the second output part connected to one longitudinal side of the second body part and extending perpendicularly to the second body part;
a first connection terminal fixedly connected to the first output part; and
a second connection terminal fixedly connected to the second output part, the first body part arranged over and parallel to the second body part, and the first output part and the second output part arranged adjacent one another and connected on the same longitudinal side of a respective one of the first body part and the second body part.

2. The bus bar assembly according to claim 1, wherein a position of the first connection terminal relative to the first bus bar is adjustable while remaining connected thereto, and a position of the second connection terminal relative to the second bus bar is adjustable while remaining connected thereto.

3. The bus bar assembly according to claim 1, further comprising an insulation component arranged between the first body part and the second body part for electrically isolating the first body part from the second body part.

4. The bus bar assembly according to claim 1, wherein the first output part and the second output part are located in a middle position of the first body part and the second body part in a length direction, respectively.

5. The bus bar assembly according to claim 1, wherein the first output part and the second output part are located at an end of the first body part and the second body part in a length direction, respectively.

6. The bus bar assembly according to claim 1, wherein the first output part and the second output part are located in a common plane perpendicular to a plane defined by each of the first body part and the second body part.

7. The bus bar assembly according to claim 1, wherein the first body part and the second body part have a common width, with two longitudinal sides of the first body part being flush with two longitudinal sides of the second body part, respectively.

8. The bus bar assembly according to claim 7, wherein widths of the first output part and the second output part are at least equal to a width of the first body part and a width of the second body part such that a width of a connection portion between the first output part and the first body part is at least equal to a width of a connection portion between the second output part and the second body part.

9. The bus bar assembly according to claim 8, wherein the first connection terminal includes a plate-shaped first connection portion fixed to the first output part, and the second connection terminal includes a plate-shaped second connection portion fixed to the second output part.

10. The bus bar assembly according to claim 9, wherein the first connection terminal further includes a first external connection plate connected to a side of the first connection portion, and the second connection terminal further includes a second external connection plate connected to a side of the second connection portion.

11. The bus bar assembly according to claim 10, wherein the first connection terminal and second connection terminal are each L-shaped.

12. The bus bar assembly according to claim 10, wherein the second external connection plate is connected to a side of the second connection portion adjacent to the first external connection plate such that a surface of the first external connection plate and a surface of the second external connection plate are adjacent and parallel to each other, and a surface of the first external connection plate and a surface of the second external connection plate are perpendicular to a length direction of the first body part and the second body part.

13. The bus bar assembly according to claim 1, wherein the plurality of first installation parts are connected to the other longitudinal side of the first body part and arranged in a row, and the plurality of second installation parts are connected to the other longitudinal side of the second body part and arranged in a row, the first installation parts and the second installation parts arranged alternately in a length direction of the first and second body parts.

14. The bus bar assembly according to claim 13, wherein the first installation parts and the second installation parts are plate-shaped and perpendicular to the width direction of the first body part and the second body part, and the first installation parts and the second installation parts are arranged in the same plane and in a row along the length direction of the first body part and the second body part.

15. The bus bar assembly according to claim 1, further comprising:
   a plurality of first connectors fixedly connected to the plurality of first installation parts, respectively; and
   a plurality of second connectors fixedly connected to the plurality of second installation parts, respectively.

16. The bus bar assembly according to claim 1, wherein:
   the first bus bar is adapted to be connected to a first pair of matching bus bars by the first connection terminal, a first external connection plate of the first connection terminal is formed with a plurality of connection holes, the position of the first connection terminal relative to the first bus bar being adjustable so that the plurality of connection holes and a plurality of connection holes in the first pair of matching bus bars may be aligned, respectively; and
   the second bus bar is adapted to be connected to a second pair of matching bus bars by the second connection terminal, a second external connection plate of the second connection terminal is formed with a plurality of connection holes, the position of the second connection terminal relative to the second bus bar is adjustable so that the plurality of forth connection holes and a plurality of connection holes in the second pair of matching bus bars may be aligned, respectively.

17. The bus bar assembly according to claim 1, wherein:
an entire surface of the first bus bar is formed with a tin coating, and only a surface area of the first connection terminal that is in contact with the first bus bar is formed with a tin coating; and
   an entire surface of the second bus bar is formed with a tin coating, and only a surface area of the second connection terminal that is in contact with the second bus bar is formed with a tin coating.

18. The bus bar assembly according to claim 17, wherein a surface area of the first connection terminal other than the surface area that is in contact with the first bus bar is formed with a nickel-plated layer, and a surface area of the second connection terminal other than the surface area that is in contact with the second bus bar is formed with a nickel-plated layer.

19. A bus bar assembly, comprising:
   a first bus bar including a first body part, a plurality of first installation parts and a first output part;
   a second bus bar including a second body part, a plurality of second installation parts and a second output part;
   a first connection terminal fixedly connected to the first output part; and
   a second connection terminal fixedly connected to the second output part, the first body part arranged over and parallel to the second body part, and the first output part and the second output part arranged adjacent one another and connected on the same side of a respective one of the first body part and the second body part, wherein the first installation parts and the first output part are located on two opposite sides of a thickness direction of the first body part, respectively, and the second installation parts and the second output part are located on two opposite sides of the thickness direction of the second body part, respectively.

20. A bus bar assembly, comprising:
   a first bus bar including a first body part, a plurality of first installation parts and a first output part;
   a second bus bar including a second body part, a plurality of second installation parts and a second output part;
   a first connection terminal fixedly connected to the first output part; and
   a second connection terminal fixedly connected to the second output part, the first body part arranged over and parallel to the second body part, and the first output part and the second output part arranged adjacent one another, wherein a position of the first connection terminal relative to the first bus bar is adjustable with the first connection terminal and the first bus bar remaining connected in each position, and a position of the second connection terminal relative to the second bus bar is adjustable with the second connection terminal and the second bus bar remaining connected in each position.

* * * * *